Patented Feb. 5, 1946

2,394,406

UNITED STATES PATENT OFFICE 2,394,406

RUBBER-LIKE MULTIPOLYMERS OF BUTADIENE HYDROCARBONS, VINYLIDENE CHLORIDE, AND ACRYLIC COMPOUNDS

Frank K. Schoenfeld, Silver Lake, Ohio, assignor to The B. F. Goodrich Company, New York, N. Y., a corporation of New York No Drawing. Application July 24, 1943,
Serial No. 496,068

16 Claims. (Cl. 260—84.5)

This application is a continuation-in-part of my copending application Serial No. 346,657 filed July 20, 1940, and relates to new synthetic rubber-like materials and to the method of preparing the same.

It has long been the desire of workers in the art of synthetic rubber-like materials to produce a synthetic rubber which would resemble natural rubber in possessing excellent plasticity, tackiness and ease of processing when unvulcanized and in being capable of vulcanization to a strong elastic condition, and at the same time would excel natural rubber in those properties, such as resistance to oils, to heat, and to oxidation, in which natural rubber is deficient. Such a synthetic rubber would be able to serve not only as a replacement for natural rubber but also in new applications in fields where natural rubber cannot be used.

The synthetic rubbers which have heretofore been prepared, however, have generally been found to be lacking in one or more of these desired characteristics. Thus, for example, the synthetic rubber produced by copolymerizing butadiene-1,3 and a lesser amount of acrylonitrile is much more resistant to oils than is natural rubber but, on the other hand, is much less plastic and tacky and can be processed only with difficulty. Similarly, other proposed synthetic rubbers prepared by copolymerizing butadiene-1,3 with other acrylic compounds or by copolymerizing butadiene-1,3 with vinylidene chloride have also been found to be lacking in the desired properties.

I have now discovered a new class of synthetic rubbers which are plastic, tacky, easily worked and easily processed in the unvulcanized state and which are also exceptionally strong, resilient and resistant in the vulcanized condition. Furthermore, as will hereinafter appear, they possess other valuable properties which make them especially useful in a number of specialized applications.

These new synthetic rubbers are polymeric materials, termed herein multipolymers because they are derived from at least three polymerizable constituents, and are prepared by the polymerization of a mixture of at least three polymerizable materials, one of which is a butadiene-1,3 hydrocarbon, another of which is vinylidene chloride and a third of which is a polymerizable acrylic compound, the butadiene-1,3 hydrocarbon component being present in the mixture to an extent of at least 50% by weight.

The term "butadiene-1,3 hydrocarbon" is used herein in its ordinary generic sense to include not only butadiene-1,3 itself (commonly called butadiene) but also the hydrocarbon homologs of butadiene-1,3 which polymerize in essentially the same manner such as isoprene, 2,3-dimethyl butadiene-1,3, piperylene, 2-methyl pentadiene-1,3 and the like. All these compounds generally possess the structure $$CH_2=\overset{\overset{H}{|}}{C}-\overset{\overset{H}{|}}{C}=\overset{\overset{H}{|}}{C}$$
$$\phantom{CH_2=}\underset{R}{|}\phantom{-C}\underset{R}{|}\phantom{=C}\underset{R}{|}$$

wherein each R is hydrogen or an alkyl group.

The term "polymerizable acrylic compound" is also used in its ordinary generic sense to include not only acrylic acid and its polymerizable homologs such as methacrylic acid, ethacrylic acid, alpha-chloro acrylic acid and the like but also the polymerizable derivatives of such acids which are hydrolyzable to yield the acids such as the nitriles, esters and amides. All such polymerizable acrylic compounds generally contain the structure $$CH_2=\overset{\overset{X}{|}}{C}-Y$$

wherein Y is a characterizing group, specifically a carboxylic acid group

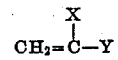

nitrile group (C≡N), ester group

wherein $R_1$ is the radical of a monohydric alcohol) or amide group

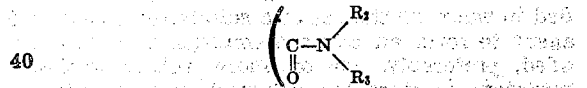

wherein $R_2$ and $R_3$ are hydrogen or hydrocarbon); and X is hydrogen or a non-characterizing substituent including hydrocarbon groups such as alkyl and aryl groups, halogen atoms such as chlorine, oxyhydrocarbon groups such as alkoxy groups, and halogen and oxy-substituted hydrocarbon groups. Typical examples of such polymerizable acrylic compounds include polymerizable acrylic nitriles such as acrylonitrile, methacrylonitrile, alpha-ethyl acrylonitrile, alpha-chloro acrylonitrile, alpha-methoxy acrylonitrile and the like; polymerizable acrylic esters such as methyl acrylate, ethyl acrylate, n-butyl acrylate, allyl acrylate, benzyl acrylate, chloroethyl acrylate, methoxy methyl acrylate and the corresponding methacrylates, ethacrylates, alpha-chloro acrylates and the like; polymerizable acrylic amides such as acrylamide and methacrylamide and polymerizable acrylic acids such as acrylic and methacrylic acid. In this invention, the use of polymerizable acrylic esters particularly alkyl esters of acrylic acid and alpha-alkyl acrylic acids, and acrylic nitriles especially the latter, as the acrylic compound, is preferred.

As mentioned hereinabove, in the production of the rubber-like multipolymers of this invention it is necessary that the mixture to be polymerized contain at least 50% by weight of the butadiene-1,3 hydrocarbon. The proportion of the other polymerizable materials, i. e., the vinylidene chloride and the arcrylic compound, should be such that at least 5% by weight of each of these materials is present, since otherwise a true multipolymer may not be formed. For production of a synthetic rubber which is plastic, tacky and easily processed in the unvulcanized condition and yields strong, resilient, oil-resistant vulcanizates, an especially desirable type of synthetic rubber, it is preferred to employ a mixture consisting of from 50 to 80% by weight of the butadiene-1,3 hydrocarbon, from 10 to 40% by weight of vinylidene chloride, preferably from 15 to 30%, and from 10 to 40% by weight of an acrylic nitrile, with a total of 100%. Still more preferably the mixture, in this case, should contain from 65 to 80% by weight of butadiene-1,3, from 15 to 25% by weight of vinylidene chloride and from 10 to 20% by weight of acrylonitrile. Similar ranges of proportions are preferably employed when other acrylic compounds are used. For other purposes, for example for the production of a synthetic latex of improved properties, it is desirable to employ as little as 5% of vinylidene chloride and as much as 40% of acrylonitrile or other acrylic compound; while for still other purposes, for example for improving the yield and increasing the speed of polymerization, it is sometimes desirable to employ as high as 40% by weight of vinylidene chloride and at little as 5% by weight of acrylonitrile.

In the practice of the invention, the polymerization of these monomer mixtures to form synthetic rubber is preferably carried out in aqueous emulsion although other methods of polymerization such as polymerization in homogenous system by the action of heat, light or catalysts may also be employed. In the emulsion polymerization process the mixture of monomers is emulsified in water by the use of a suitable emulsifying agent to form an aqueous emulsion to which is aded, preferably, one or more polymerization initiators to start the polymerization reaction, one or more polymerization accelerators or catalysts to speed up the reaction and one or more polymerization modifiers to improve the quality of the product. The emulsion is then agitated at a temperature of about 20 to 80° C. for a time sufficient to complete the polymerization, or for a time sufficient to convert a desired proportion of the monomers into polymers, say 75%, about 10 to 100 hours usually being required. The polymerization product, which is obtained in the form of an aqueous dispersion resembling natural rubber latex is then stabilized by the addition of an age-resistor such as phenyl-beta-naphthylamine, treated to remove unpolymerized monomers if these are present, and then utilized as such, in the manner natural rubber latex is used, or coagulated in the usual manner to produce a crude synthetic rubber-resembling crude natural rubber.

Emulsifying agents which may be used in the above process include soaps of fatty acids such as the sodium and potassium salts of lauric, myristic, palmitic, oleic or stearic acids, soaps of rosin acids, and other soap-like materials including salts of organic bases containing long carbon chains such as cetyl trimethyl ammonium methyl sulfate, alkali metal hymolal sulfates such as sodium lauryl sulfate, and aryl and alkaryl sulfonates such as sodium isobutyl naphthalene sulfonate and sodium decyl benzene sulfonate.

Polymerization initiators (sometimes called catalysts) which may be used in the emulsion polymerization process include per-oxygen compounds such as hydrogen peroxide, benzoyl peroxide, potassium persulfate, sodium perborate, potassium percarbonate and the like as well as other types of initiators such as diazoamino benzene and dipotassium diazomethane disulfonate. Polymerization accelerators (also sometimes called catalysts and activators) which may be used include heavy metal salts such as ferrous sulfate, cobalt chloride and the like, sodium pyrophosphate etc. Polymerization modifiers which are also preferably present during the polymerization to improve the plasticity and solubility of the product are usually sulfur-containing organic compounds such as dialkyl dixanthogens, aliphatic mercaptans, the higher tetralkyl thiuram mono-, di- and polysulfides, the 2-mercapto thiazoles and the like.

Other polymerization initiators, accelerators and modifiers or other substances which enable the polymerization to be carried out in a shorter time and/or which in some manner improve the quality of the products obtained may also be included in the emulsion before polymerization. All these added substances are mentioned only to indicate that best results are obtained when one or more of them are present, and it is to be understood that the monomer mixtures may be polymerized in the absence of these added substances if desired.

The method of preparing the rubber-like multipolymers of this invention and the unexpectedly desirable properties which they have been found to possess may further be illustrated by the following specific examples in which the parts, unless otherwise indicated, are by weight.

*Example I*

An emulsion containing the following ingredients is prepared:

| | Parts |
|---|---|
| Butadiene-1,3 | 75 |
| Vinylidene chloride | 15 |
| Acrylonitrile | 10 |
| Emulsifying solution (2% aqueous myristic acid 90% neutralized with alkali) | 250 |
| Hydrogen peroxide (3½% aqueous solution) | 10 |
| Di-isopropyl dixanthogen | 0.3 |

The emulsion is then agitated for 24 hours at a temperature of 40° C. An 87% yield of a rubber-like multipolymer is obtained. The multipolymer is a soft, coherent, plastic, tacky material which may easily be worked on a hot or cold mixing mill in the manner customary with natural rubber. It is 90% soluble in benzene. When compounded in a typical test recipe with carbon black, stearic acid, zinc oxide, sulfur and a vulcanization accelerator and then vulcanized, a vulcanizate is obtained which possesses a tensile strength of about 4,000 lbs./sq. in. and a 450% elongation. It is also resistant to oils and chemicals and withstands the effects of aging.

When a similar emulsion containing 75 parts of butadiene-1,3 and 25 parts of acrylonitrile is polymerized, the product is a non-plastic, non-tacky material which cannot be milled satisfactorily on a hot mill and which is only 37% soluble in benzene. When vulcanized, this copolymer exhibits properties substantially the same as that of the above-prepared multipolymer. On the other hand, when a similar emulsion containing 75 parts of butadiene-1,3 and 25 parts of vinylidene chloride is polymerized, the product is a granular non-coherent material not possessing the desired soft rubber-like properties. It similarly is incompletely soluble in benzene. Moreover, in this event, the polymerization requires over 100 hours and only an 80% yield of copolymer is obtained. Additionally the copolymer, when vulcanized, possesses tensile strengths of less than 2,500 lbs./sq. in. and only about a 200% elongation.

*Example II*

Example I is repeated except that the following proportions of polymerizable materials are employed:

| | Parts |
|---|---|
| Butadiene-1,3 | 70 |
| Vinylidene chloride | 20 |
| Acrylonitrile | 10 |

The polymerization requires 43 hours at 30° C. and produces a 90% yield of a rubber-like multipolymer having properties similar to those of the product described in Example I. When 70 parts of butadiene-1,3 and 30 parts of vinylidene chloride are similarly polymerized, the polymerization requires over 200 hours at 30° C. to produce a 69% yield of a rubber-like material which possesses far inferior tensile strength and elongation.

*Example III*

A mixture of 55 parts of butadiene-1,3, 38.2 parts of acrylonitrile and 6.8 parts of vinylidene chloride is polymerized in the presence of 200 parts of a 1.5% aqueous solution of an alkyl benzene sulfonate as an emulsifying agent, 0.35 part of hydrogen peroxide as a polymerization initiator, 0.40 part of diisopropyl dixanthogen as a polymerization modifier and 0.2 part of a catalyst mixture comprising ferric sulfate, cobalt chloride and sodium pyrophosphate. The polymerization is complete in about 21 hours and the product is a latex-like dispersion resembling natural rubber latex. Films deposited from this latex by the coagulant dip or electrodeposition methods or simply by allowing a small amount of the latex to dry on a glass plate are found to possess excellent properties, that is, they are plastic, tacky and freely flexible yet are tough and possess excellent strength both when wet and dry. A similar latex from 55 parts of butadiene-1,3 and 45 parts of acrylonitrile required 24 hours for preparation and the films deposited therefrom were inferior in properties having inferior plasticity and low wet-film strength. When the above example is repeated using as the polymerizable materials 55 parts of butadiene-1,3, 40 parts of vinylidene chloride and 5 parts of acrylamide, a similar latex from which excellent films may be deposited is obtained. However, a latex prepared from butadiene-1,3 and vinylidene chloride alone is not suitable for the deposition of strong tough films.

*Example IV*

A mixture of 60 parts of butadiene-1,3, 20 parts of methyl acrylate and 20 parts of vinylidene chloride is polymerized in an aqueous emulsion in the presence of 250 parts of a 5% solution of a fatty acid soap, 0.3 part of potassium persulfate and 0.3 part of lauryl mercaptan. The resulting synthetic rubber is completely soluble in benzene and acetone and from it cements of high tack which are useful in a number of applications as adhesives, is obtained. Similar synthetic rubbers from butadiene-1,3 and methyl acrylate or from butadiene-1,3 and vinylidene chloride are not so well suited for this purpose.

The above specific examples have been cited only for purposes of illustration and it is not intended that the invention be limited solely thereto for it is to be understood that variations in the nature and proportions of materials polymerized and in the polymerization conditions, in accordance with the above disclosure, may be effected therein without departing from the spirit and scope of the invention as defined by the appended claims.

I claim:

1. The process which comprises polymerizing a mixture of monomeric materials comprising at least 50% by weight of a butadiene-1,3 hydrocarbon, at least 5% by weight of vinylidene chloride and at least 5% by weight of a polymerizable acrylic compound containing a single olefinic double bond linking a methylene ($CH_2$) group and a carbon atom.

2. The process which comprises polymerizing in aqueous emulsion a mixture of monomeric materials comprising from 50 to 80% by weight of a butadiene-1,3 hydrocarbon, from 10 to 40% by weight of vinylidene chloride and from 10 to 40% by weight of a polymerizable acrylic compound containing a single olefinic double bond linking a methylene ($CH_2$) group and a carbon atom.

3. The process which comprises polymerizing in aqueous emulsion a mixture of monomeric materials comprising from 50 to 80% by weight of a butadiene-1,3 hydrocarbon, from 10 to 40% by weight of vinylidene chloride and from 10 to 40% by weight of a polymerizable acrylic nitrile containing a single olefinic double bond linking a methylene ($CH_2$) group and a carbon atom.

4. The process which comprises polymerizing in aqueous emulsion a mixture of monomers consisting of at least 50% by weight of butadiene-1,3, at least 5% by weight of vinylidene chloride and at least 5% by weight of acrylonitrile.

5. The process which comprises polymerizing in aqueous emulsion a mixture of monomers consisting of 65 to 80% by weight of butadiene-1,3, 15 to 25% by weight of vinylidene chloride, and 10 to 20% by weight of acrylonitrile.

6. The process which comprises polymerizing in aqueous emulsion a mixture of monomeric materials comprising from 50 to 80% by weight of a butadiene-1,3 hydrocarbon, from 10 to 40% by weight of vinylidene chloride and from 10 to 40% by weight of a polymerizable acrylic ester containing a single olefinic double bond linking a methylene ($CH_2$) group and a carbon atom.

7. The process which comprises polymerizing in aqueous emulsion a mixture of monomeric materials comprising from 50 to 80% by weight of butadiene-1,3, from 10 to 40% by weight of vinylidene chloride and from 10 to 40% by weight of a polymerizable alkyl ester of acrylic acid containing a single olefinic double bond linking a methylene (CH₂) group and a carbon atom.

8. The process which comprises polymerizing in aqueous emulsion a mixture of monomers consisting of 50 to 80% by weight of butadiene-1,3, 10 to 40% by weight of vinylidene chloride and 10 to 40% by weight of methyl acrylate.

9. A rubber-like multipolymer prepared by the method of claim 1.

10. A rubber-like multipolymer prepared by the method of claim 2.

11. A rubber-like multipolymer prepared by the method of claim 3.

12. A rubber-like multipolymer prepared by the method of claim 4.

13. A rubber-like multipolymer prepared by the method of claim 5.

14. A rubber-like multipolymer prepared by the method of claim 6.

15. A rubber-like multipolymer prepared by the method of claim 7.

16. A rubber-like multipolymer prepared by the method of claim 8.

FRANK K. SCHOENFELD.